US008812054B2

(12) United States Patent
Hannu et al.

(10) Patent No.: US 8,812,054 B2
(45) Date of Patent: Aug. 19, 2014

(54) SIMPLIFIED RADIO MULTICAST FOR GROUP COMMUNICATION

(75) Inventors: Hans Hannu, Lulea (SE); Peter de Bruin, Gammelstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 405 days.

(21) Appl. No.: 12/676,436

(22) PCT Filed: Aug. 19, 2008

(86) PCT No.: PCT/SE2008/050930
§ 371 (c)(1),
(2), (4) Date: Mar. 4, 2010

(87) PCT Pub. No.: WO2009/035400
PCT Pub. Date: Mar. 19, 2009

(65) Prior Publication Data
US 2010/0203921 A1    Aug. 12, 2010

(30) Foreign Application Priority Data
Sep. 10, 2007    (SE) ........................ 0702026

(51) Int. Cl.
*H04B 1/38* (2006.01)
(52) U.S. Cl.
USPC ........................... 455/558; 455/90.2; 370/390
(58) Field of Classification Search
USPC ................... 455/90.2, 558; 370/390
See application file for complete search history.

(56) References Cited

U.S. PATENT DOCUMENTS

| 6,272,334 B1 | 8/2001 | Rao |
| 6,324,405 B1 * | 11/2001 | Young et al. ............... 455/456.1 |
| 6,442,396 B1 | 8/2002 | Schmidt et al. |
| 6,484,037 B1 | 11/2002 | Schmidt et al. |
| 6,725,052 B1 | 4/2004 | Raith |
| 2002/0106985 A1 * | 8/2002 | Sato et al. .................... 455/3.01 |
| 2005/0068955 A1 * | 3/2005 | Shimazaki .................... 370/390 |
| 2005/0144485 A1 | 6/2005 | Mousseau |
| 2005/0276237 A1 | 12/2005 | Segal et al. |
| 2008/0096555 A1 * | 4/2008 | Herrmann .................. 455/435.1 |

FOREIGN PATENT DOCUMENTS

| CN | 1601926 A | 3/2005 |
| CN | 101027932 A | 8/2007 |
| EP | 1619832 A2 | 1/2006 |
| WO | 2005/104594 A1 | 11/2005 |
| WO | 2006/057923 A2 | 6/2006 |
| WO | 2006/096013 A1 | 9/2006 |
| WO | 2007/042079 A1 | 4/2007 |
| WO | 2008/087532 A2 | 7/2008 |

* cited by examiner

Primary Examiner — Hsin-Chun Liao
(74) Attorney, Agent, or Firm — Coats & Bennett, P.L.L.C.

(57) ABSTRACT

The present invention relates to a group communication solution in a wireless communication network comprising at least one base station (5) and a plurality of terminals (1, 2, 3, 4) communicating wirelessly with the base station and where the terminals has at least partly identical identity references in order to be part of a multicast protocol push to talk group.

9 Claims, 4 Drawing Sheets

SIMPLIFIED RADIO MULTICAST FOR GROUP COMMUNICATION

TECHNICAL FIELD

The present invention relates to group communication in a wireless communication network and in particular to group communication in a push to talk configuration.

BACKGROUND OF THE INVENTION

The ability to communicate with each other is a fundamental part of our lives and work environment. Since the advent of wireless communication devices we have grown accustomed to being able to communicate whenever and wherever we are. This of course has huge benefits but as the number of people communicating in this manner grows quickly this sets a tough demand on the communication infrastructure to follow suite. People using these wireless communication possibilities require a certain degree of quality and safety with their communication sessions.

Public safety groups, such as police, rescue personnel, and similar task forces also have a desire to communicate with each other with good quality and preferably on secure links on wireless communication channels, for instance at a location where a situation is under way where the task forces are operating.

So called Push-to-talk services over cellular access is seen as a solution to Public Safety group communication. There are a number of issues to overcome, which of one is the very high requirements on capacity, in particular the requirement on a very large number of users in one single cell.

A solution may be to transmit the voice information via radio multicast, similar to existing solutions for legacy Public Safety systems. Multimedia Broadcast Multicast Service (MBMS) is a solution, standardized in 3GPP for cellular systems.

This is a short summary of basic MBMS GERAN (GSM EDGE Radio Access Network) functionality.
  The downlink common data stream of an MBMS session originates from a server called BM-SC (Broadcast Multicast Service Center).
  One data stream per involved GGSN, SGSN and BSC (Base Station Controller).
  An MBMS service context is set up per BSC initiated by the message MBMS SESSION START REQUEST received from SGSN. The BSC shall extract the following information contained in the message: Temporary Mobile Group Identity (TMGI), MBMS Session Identity (optional), MBMS service Area Identity List, Estimated Session Duration and Guarantied Bit Rate.
  MBMS sessions are notified to capable mobiles by a special PAGING REQUEST message containing among others TMGI and MBMS Session ID (Identity).
  MBMS bearers (Packet Data Channels) are uniquely established per session and cell by a BSS MBMS assignment procedure invoked by MBMS service requests from mobiles belonging to the right TMGI.
There are some problems with the current standardized solution of MBMS.
  Uplink Packed Data Channels reserved for an MBMS session can only be used for the signaling needed to maintain the downlink data stream, e.g. ACK/NACK messages etc.
  A mobile may not be in packet transfer mode when receiving an MBMS session according to the 3GPP standard of today.
  The new standard for PS (packet Switched) handover (3GPP Rel 7) is not planned to be used for MBMS.

SUMMARY OF THE INVENTION

The object of the present invention is to remedy at least some of these problems and provide a solution for push to talk applications which may handle large numbers of users in each cell.

This is provided in a number of aspects of the present invention in which a first is a method for enabling efficient utilization of radio access network resources for a plurality of terminals participating in a group communication in a communication system comprising at least one radio coverage cell and at least one base station system, comprising the steps of:
  providing each terminal within the group communication with an at least partly identical identification reference;
  identifying the participating terminals towards the infrastructure network at least partly as one and the same identity; and
  sending from the infrastructure device communication data using a multicast protocol for transport of communication data to each terminal part of the group communication using the at least partly identical identification reference.

The identity may be at least one an International Mobile Subscriber Identity, i.e. IMSI, of the terminal's Subscriber Identity Module, i.e. SIM, card or a stored IMSI in a memory of the terminal. The terminals may have identical International Mobile Equipment Identities, i.e. IMEI.

The terminals may further have identifiable International Mobile Subscriber Identity, i.e. IMSI, or International Mobile Equipment Identity, i.e. IMEI, to be able to access the network so as to be provided with normal functions provided to terminals with unique IMSI or IMEI.

The method may further comprise a step of encrypting communication data between terminals part of the group communication.

The communication may be a push to talk session.

Another aspect of the present invention is provided, a terminal for wireless communication in a communication network, comprising:
  a processing unit;
  a memory unit;
  a communication interface;
  wherein the processing unit is arranged to run software stored in the memory for participating in group communication using an identification reference used by a plurality of terminals within the same group communication.

An infrastructure device (5) in a wireless communication network, comprising:
a processing unit (401);
a memory unit (402);
an access communication interface (404) for communicating with terminals (1, 2, 3, 4);
a network communication interface (405) for communicating with an infrastructure network (6);
  wherein the processing unit is arranged to send communication data to a plurality of terminals using a multicast protocol and arranged to handle other functions suitable for group communication where terminals communicating with the infrastructure device have at least partly identical identification references.

The infrastructure device according to claim 12, wherein said functions being a paging function/method, location, and routing area updating function.

Yet another aspect of the present invention is provided, a communication network for wireless group communication, comprising:
- at least one infrastructure device;
- at least one radio coverage cell;
- at least two terminals arranged to communicate wirelessly with the infrastructure device in the radio coverage cell, each terminal has an identification reference;
- wherein the terminals use at least partly identical identification references and the infrastructure device send communication data using a multicast protocol with the at least partly identical identification reference.

The basic concept of this solution is to make several terminals (e.g. mobile phones or other mobile equipment with communication interface), User Equipments (UE), to be seen as one entity towards the network, or i.e. several UEs are identified as only one and the same UE by the network, but at possible different geographical locations.

The simplified RAN multicast is achieved by; all UEs participating in a group communication session having the same IMSI and possible also the same IMEI; and functions and methods in the network which are normally only valid for one UE with one IMSI are altered to be valid for several UEs having the same IMSI.

This has the advantage of providing a solution capable of handling a large plurality of UEs in communication using an MBMS solution efficiently handling radio access network resources while at the same time being implemented at low cost and complexity.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

Figure 1:
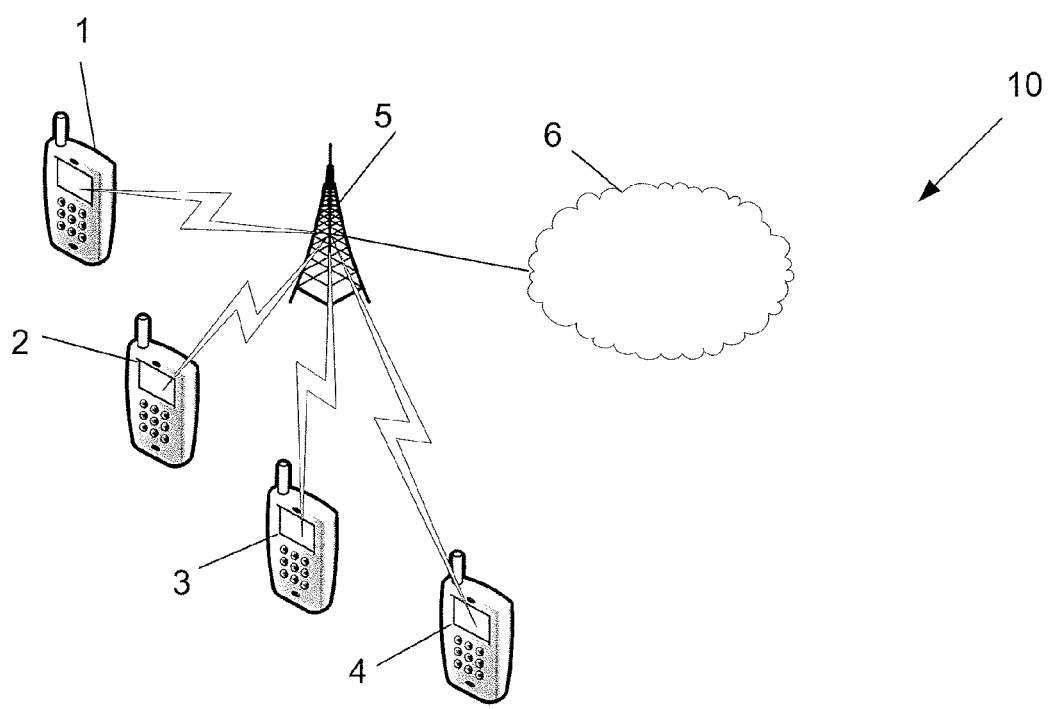
FIG. 1 illustrates schematically a network according to the present invention.

In FIG. 1 reference numeral 10 generally indicate a network according to the present invention with a central communication station 5, e.g. a base station optionally connected to a communication network 6. The base station has at least one radio transmitter covering a radio coverage cell (not shown). One or several user terminals 1, 2, 3, 4 (UE, User Equipment) within radio coverage of the base station may connect to the base station 5 using a wireless communication protocol. The UEs may communicate with each other using a push to talk protocol and optionally may be arranged to use other communication protocols as well, for instance but not limited to GPRS or UMTS, e.g. 2G (e.g. GSM), 2.5G, and 3G (e.g. WCDMA or LTE). The UEs are arranged with an identification reference (such as an IMSI, International Mobile Subscriber Identity) which may be connected to a physical media (such as a SIM card, Subscriber Identity Module) or to a virtual entity (such as a virtual SIM).

The present invention is not limited to a single radio coverage cell but may extend to several cells in communication with each other via an infrastructure network 6.

A UE (or user) is identified by the IMSI within the SIM card. By having multiple duplicated SIM cards or multiple SIM cards with the same IMSI in several different UEs, these UEs would be seen as one and the same UE (or user). The IMSI is used at the LLC (Link Layer Control) layer to assign a TLLI, which is further used to route data between the SGSN and UE. Hence, several UEs possibly at different geographical locations may be identified as one UE, and thus when data is to be sent to this "multi-location UE" using a multicast protocol, e.g. MBMS, several users at different locations but in the same cell would listen to the same communication channel, such as the TBF and time slots in GSM/(E)GPRS. If there are several groups of users (or individual users) in different cells, they would still be listening to the same information, i.e. the network would see all UEs as one UE, and RAN multicast is achieved.

One user could have several IMSIs in one UE/SIM. One could be a private IMSI and other IMSIs for each large group that would require multicast. Hence, larger groups, e.g. with two or more users, may be pre-configured and assigned an IMSI to use in a multicast session solution.

Figure 2:
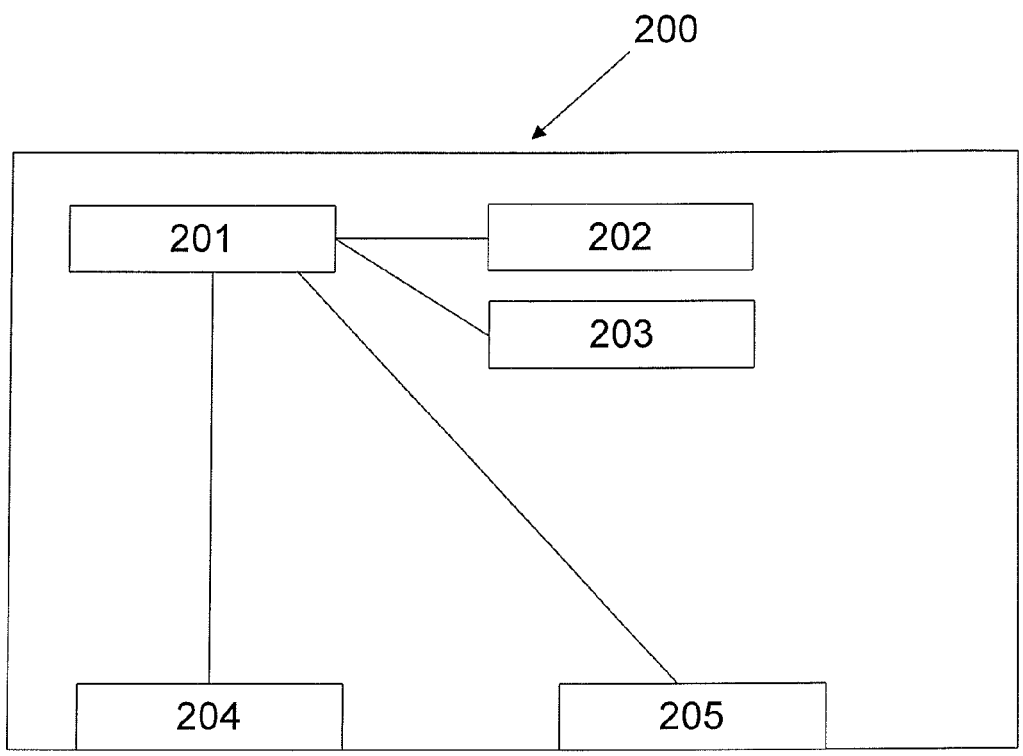
FIG. 2 illustrates schematically in a block diagram a device according to the present invention.

The present invention may be realized in the UE which is then arranged to handle this type of solution. FIG. 2 illustrates a UE 200 with a processing unit 201, at least one memory unit 202, and a user interface 203. Furthermore, the UE 200 has a communication interface 204 for wireless communication with a network and optionally an interface 205 to identification reference hardware, e.g. a card, such as a SIM card slot.

The processing unit is arranged to run program code for receiving the identification reference that is common for the group within the push to talk group. The memory unit may comprise any suitable type of memory: volatile or non-volatile such as but not limited to RAM, ROM, EEPROM, Flash, hard disk, and so on as understood by the skilled person. The UE may for instance be a mobile phone, PDA, laptop, PC, smart phone, or some other hardware unit arranged with a communication interface for communicating wirelessly with an infrastructure device (e.g. base station). The communication interface may for example be at least one of GSM, GPRS, UMTS, CDMA, WCDMA, LTE, and so on; however, the infrastructure need to be able to handle Push to talk functionality and preferably the communication uses a packet based communication protocol. The program code may be provided at production of the UE or downloaded using the wireless communication network or downloaded using a PC or similar connectivity device in connection with a network.

The identification reference may be received using the SIM card interface or a virtual solution where the reference may be downloaded into the UE using the wireless communication interface or a communication interface to a computer or similar product dispatching identification references to members of the group communication.

Depending on communication functionality, the infrastructure may have different types of functionality implemented, e.g. in the base station or in devices further up in the infrastructure network (e.g. GGSN or SGSN for a 3GPP network). An infrastructure device may have a processing unit and memory and at least two communication interfaces (one downlink and one uplink); however, it should be understood that these communication interfaces may be the same physical interface but separated logically. Further parts of the infrastructure devices for maintaining communication channels and operating sessions may differ depending on exact type and setup of communication solution but this is not within the scope of the present invention and should be understood by the skilled person.

The infrastructure side of the communication network may be arranged to handle functions and methods, normally valid for only one specific identity, in a similar manner for a plurality of UEs with the same identity, for instance paging, positioning, location, and routing functionality.

In order to handle legal issues there may be functionality built into the infrastructure for handling billing, security, and other normal operational matters. Identification of each user in the group may be done in the application layer, e.g. as of today's PoC, as the users in these groups would be at the Radio Access Network (RAN) seen as the same user/UE.

The network and user application may also potentially utilize P-Headers in SIP/IMS to keep track of where their parties are within the network. This may then further be used for avoiding several paging responses, RA, and cell updates. Hence, one UE assigned by e.g. priority out of several UEs would respond.

The IMSI and/or IMEI or other corresponding identifier such as the TLLI may also be used by the network in order to decide whether this UE shall be treated in a different way compared to what is normally done.

Figure 3:
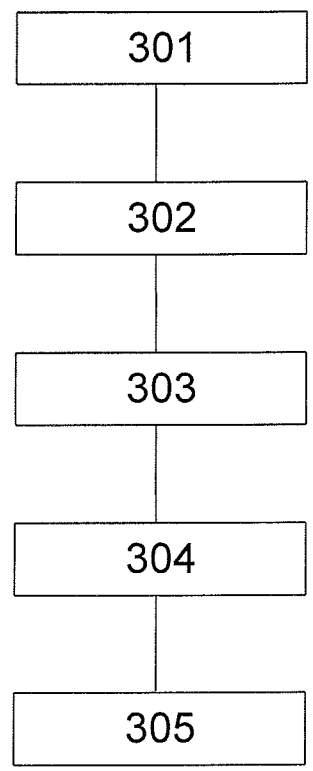
FIG. 3 illustrates schematically in a block diagram a method according to the present invention.

FIG. 3 illustrates a method for setting up and maintaining a group session according to the present invention:

301. Receiving an identical identification reference in a plurality of UEs; The UEs may receive this from the identification hardware, it may be stored in the UE, or it may be transmitted using a suitable communication channel from an infrastructure device or one of the participating UEs;

302. Registering this identification in at least one infrastructure network device in such a manner as to make the infrastructure device aware of using this identification for communication of a certain session;

303. Sending communication data relating to this session from the UE to the infrastructure device;

304. Sending communication data using identical identification reference from the infrastructure device to each of the UEs part of the group.

305. Receiving the communication data in the plurality of UEs.

With the solution according to the present invention:
multicast transmission over the RAN may be achieved, without implementing MBMS support;
the radio access network may be efficiently utilized; and
it is possible upgrade existing UEs to being able to participate in a group communication session according to the present invention without hardware changes or with only minor changes (e.g. changing the SIM card to one with several identification references).

In one embodiment of the present invention, the identification reference is not identical in all UEs but the identification reference may be partly identical, e.g. a specified length of the reference may be identical and a remaining length part of the reference may be unique for each UE. This has an advantage of allowing the other UEs and/or infrastructure to identify a communicating UE participating in the group session. For instance, the infrastructure may in such a case be able to log the individual user's behavior and provide individual services to the users or UEs since the infrastructure may identify each UE individually even though they participate in the group communication.

Figure 4:
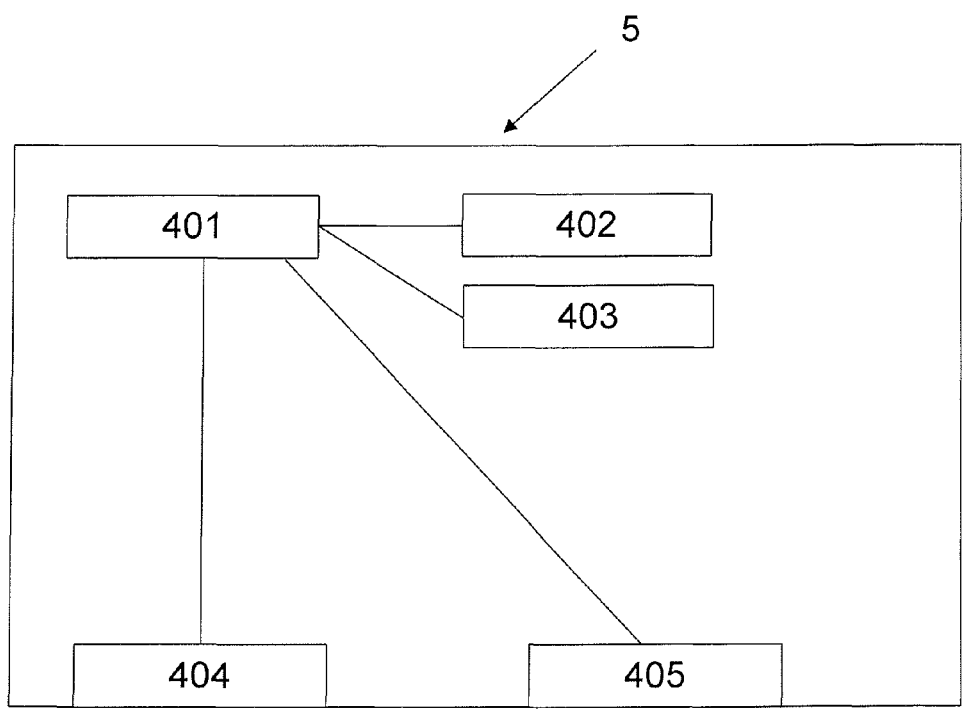
FIG. 4 illustrates schematically in a block diagram an infrastructure device according to the present invention.

The present invention may also in part be realized in the infrastructure device (e.g. a base station) which is then arranged to handle this type of solution. FIG. 4 illustrates a base station 5 with a processing unit 401, at least one memory unit 402, and optionally other units 403 for operating the infrastructure device 5 (e.g. power unit, co-processor(s), and so on as understood by the skilled person). Furthermore, the base station 5 has a communication interface 404 for wireless communication with terminals and a communication interface 405 for communication with an infrastructure network.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, and that several "means", "units" or "devices" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

BSC Base station controller
BSS Base Station System
DL Downlink
GERAN GSM EDGE Radio Access Network
GGSN Gateway GPRS Support Node
GSM Global System for Mobile communication
IMEI International Mobile Equipment Identity
IMSI International mobile subscriber identity
LLC Link layer control
LTE Long Term Evolution
MBMS Multimedia Broadcast Multicast Service
PTT Push-To-Talk
RA Routing Area
RLC AM radio link control acknowledged mode
SGSN Serving GPRS Support Node
SIM Subscriber Identity Module
SIP/IMS Session Initiation Protocol/IP multimedia subsystem
TBF Temporary Block Flows
TLLI Temporary Link Layer identifier
TMGI Temporary mobile group identifier
TS Time Slot
UE User Equipment
UL Uplink
WCDMA Wideband Code division multiple access

The invention claimed is:

1. A method for enabling efficient utilization of radio access network resources for a plurality of terminals to exchange voice information in a group communication in a communication system comprising at least one radio coverage cell and at least one base station system, the method comprising:
sending an at least partly identical identification reference to each terminal within the group communication;
identifying the participating terminals towards an infrastructure-side of the communication system at least partly as one and the same identity;
receiving voice information from one of the plurality of terminals; and
sending the voice information from an infrastructure device to the rest of the plurality of terminals that are part of the group communication using the at least partly identical identification reference;
wherein the voice information is sent using a multicast protocol; and wherein, within a given single cell, the voice information is sent over a common downlink data channel for each of the rest of the terminals within the group that are within the given cell.

2. The method according to claim 1, wherein said at least partly identical identification reference is at least one of an International Mobile Subscriber Identity (IMSI) of a terminal's Subscriber Identity Module (SIM) card or a stored IMSI in a memory of the terminal.

3. The method according to claim 1, wherein the terminals have identical International Mobile Equipment Identities (IMEIs).

4. The method according to claim 1, wherein the terminals have identifiable International Mobile Subscriber Identities (IMSIs) or International Mobile Equipment Identities (IMEIs), to be able to access the network so as to be provided with normal functions provided to terminals with unique IMSIs or IMEIs.

5. The method according to claim 1, further comprising encrypting voice information transmitted to terminals that are part of the group communication.

6. The method according to claim 1, wherein the communication is a push to talk session.

7. An infrastructure device operable to enable a plurality of terminals to exchange voice information in a group communication in a wireless communication network, said infrastructure device comprising:

a memory unit;
an access communication interface for communicating with a plurality of terminals;
a network communication interface for communicating with an infrastructure network; and
a processing unit operatively associated with the memory unit and the access and network communication interfaces, wherein the processing unit is configured to:
send an at least partly identical identification reference to each terminal within the group communication;
receive voice information from one of the plurality of terminals; and
send the voice information to the rest of the plurality of terminals using a multicast protocol and using the at least partly identical identification reference;
wherein, within a given cell, the processing unit sends the voice information to the rest of the plurality of terminals within the group that are within the cell using the multicast protocol over a common downlink channel.

8. The infrastructure device according to claim 7, wherein said functions include paging, location, and routing functions.

9. The method of claim 1, wherein each terminal within the group has a private International Mobile Subscriber Identity (IMSI) used for non-group communication, and also has a shared IMSI used for group communication.

* * * * *